Jan. 6, 1970  W. S. JOHNSTON  3,488,099
BEARING SUPPORT APPARATUS FOR A DANDY ROLL
Filed Nov. 28, 1967

INVENTOR
WILLIAM S. JOHNSTON

United States Patent Office 3,488,099
Patented Jan. 6, 1970

3,488,099
BEARING SUPPORT APPARATUS
FOR A DANDY ROLL
William S. Johnston, Menasha, Wis., assignor to Spencer-Johnston Company, Inc., Appleton, Wis., a corporation of Wisconsin
Filed Nov. 28, 1967, Ser. No. 686,243
Int. Cl. F16c 27/00, 55/00, 13/00
U.S. Cl. 308—26                         3 Claims

ABSTRACT OF THE DISCLOSURE

A cylindrical dandy roll has trunnions projecting from its ends by which it is supported across the frame of a papermaking machine. About each trunnion is a cast steel bearing housing, containing bearings for rotatably supporting the trunnions, and having as integral parts thereof a pintle hook projecting from one side and a support bracket with a vertically adjustable bolt threaded through a hole in it projecting from the other side, and an eye mounted to project upwardly from its top. The pintle hook engages a pintle projecting horizontally from the pintle stand on the machine frame, and the bracket rests upon a pneumatic cushion that stands on the machine frame just inside of the bolt.

Background of the invention

A dandy roll is an open-faced roll that rides on top of the paper web on the wet end of the Fourdrinier papermaking machine. The construction of one dandy roll is shown in the co-pending application of the same inventor, Ser. No. 418,005, filed on Dec. 14, 1964 and entitled "Winding Wire for an Open Face Roll." At regular intervals, the dandy roll must be removed from the machine either for cleaning, refacing, or for general rebuilding, hence the mounting of the dandy roll must be such as to facilitate and expedite the mounting and replacement of dandy rolls. With papermaking machines operating at thousands of feet per minute, whether the dandy roll be an idler driven by its contact with the paper web, or, as is becoming more common, the dandy roll is itself driven, the mounting of the dandy roll must be such as will withstand the stresses thus imposed upon it to provide a stable and durable support for the dandy roll.

In the past, a heavy lever was mounted on each side of the papermaking machine frame and the bearings for the dandy roll had projections which fitted into slots in the top of the lever, and the projections were pinned into the slots by pins passing through the lever and the projections. This arrangement was heavy, costly to make, cumbersome to work with and resulted in excess down time when replacement of the dandy roll was required.

Summary of the invention

The present invention relates to a bearing support apparatus for mounting a dandy roll on a papermaking machine frame and more particularly the invention resides in a bearing support comprising the combination of a bearing housing for containing and supporting bearings that support the trunnions of the dandy roll, said bearing having a hinge member projecting from one end and adapted to releasably engage a mating hinge member mounted on said papermaking machine frame, and a support bracket projecting from a side of said bearing housing opposite from said hinge member and adapted to be supported on said papermaking machine frame.

The foregoing combination provides a bearing support apparatus that is ruggedly simple in its construction, and of such light weight as compared to the prior art supports that its cost is approximately half of the said prior art bearing support. A dandy roll mounted on bearing supports according to the present invention may be very rapidly removed and a substitute replaced on the papermaking machine with a minimum down time of the papermaking machine and with minimum work required of the millwrights in making the exchange. The cost reduction of the bearing of the present invention over prior art bearings is such that dandy rolls may be supplied from the manufacturer with the bearing mounted on the trunnions, so that the dandy roll is ready for immediate use on the papermaking machine without delays encountered with the prior art in removing the bearing from the old dandy roll and replacing it on the new.

Description of the preferred embodiment

Figure 1:
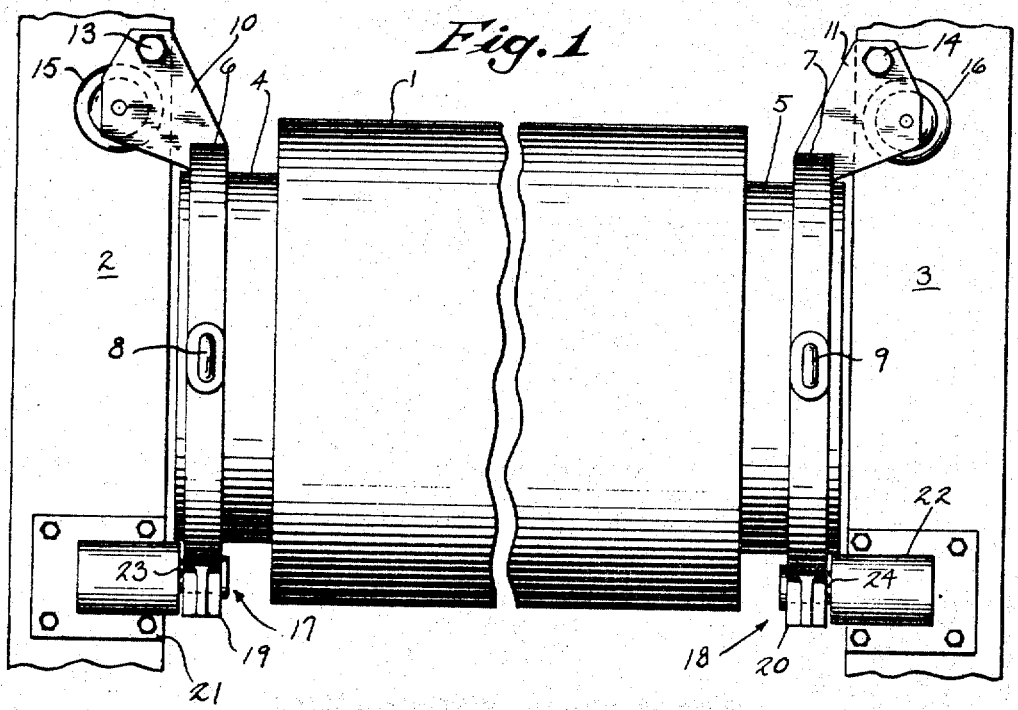
FIG. 1 is a top plan view of a dandy roll having bearing supports on trunnions and embodying the present invention.
Figure 2:
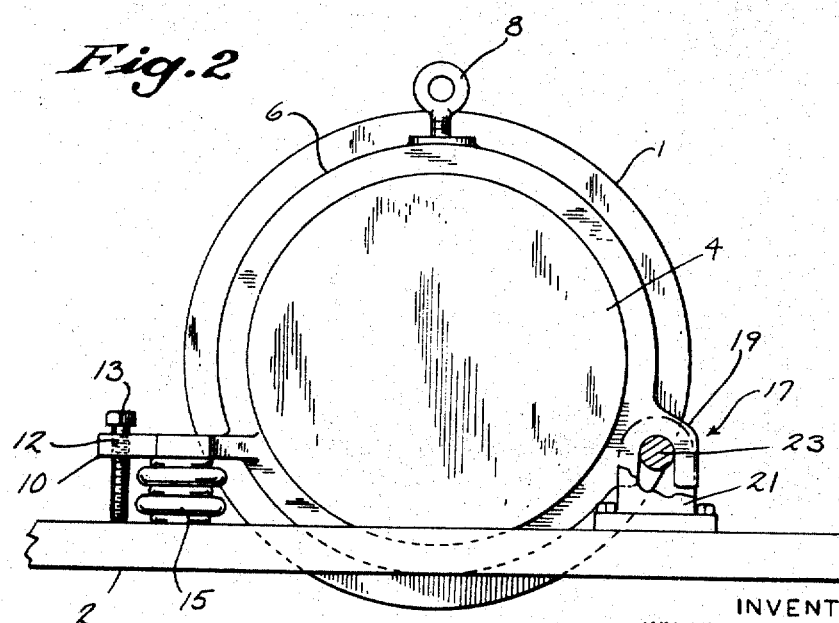
FIG. 2 is a side elevation of the bearing support shown in FIG. 1 and embodying the present invention.

In FIG. 1, a dandy roll 1 is clearly shown spanning frame members 2 and 3 of a papermaking machine. The dandy roll 1 is an open-face roll constructed by mounting a woven papermaking wire about an open, cylindrical framework. The length of the dandy roll 1 is approximately equal to the width of the Fourdrinier wire (not shown) on which the web of paper fibers (not shown) is formed on a Fourdrinier papermaking machine. The dandy roll 1 functions to aid in the formation of the paper web, to facilitate drying of the web and to imprint water marks in the web. To accomplish those functions, the dandy roll 1 rotates on top of the web (not shown) and is either an idler driven by the moving web, or driven by an appropriate drive means. Since Fourdrinier wires are commonly anywhere from 76 inches to 200 or more inches in width, dandy rolls of commensurate lengths are also employed and dandy rolls ranging in diameter from approximately one half foot to four feet are not uncommon, the diameter increasing with the speed of the papermaking machine so as to limit the speed of the dandy roll to about 200 r.p.m., which experience thus far indicates to be optimum. Projecting from each end of the cylindrical dandy roll 1, are trunnions 4 and 5 by which the dandy roll 1 is supported and mounted. A linguistic distinction may be made between trunnion mounted dandy rolls and shaft mounted dandy rolls, the trunnions being of diameter as shown in the drawings and being mounted on the ends of the open framework, and the shafts being of typical shaft diameter and extending through the length of the dandy roll. The shaft mounting was an older type of mounting that seems to be declining in use. Be that as it may, no such distinction is made for the purposes of the present invention, and reference made to trunnions is intended to include shafts as well.

Around each trunnion 4 and 5 is a cast steel bearing housing 6 and 7, respectively. The bearing housings 6 and 7 contain and support the bearings (not shown) which rotatably support the trunnions 4 and 5 on the dandy roll. The bearing housings 6 and 7 are each annular members with eyes 8 and 9 projecting vertically upward from their tops to be engaged by the hook of a crane for hoisting the dandy roll 1 into, and out of position on the papermaking machine frame 2 and 3. Brackets 10 and 11 project horizontally from one side of the bearing housings 6 and 7, respectively, and each of the brackets 10 and 11 has a vertical threaded hole 12 through its extended end set bolts 13 and 14 are screw mounted through the threaded holes, so that they may be adjusted to control the height of the dandy roll 1 with respect to the Fourdrinier wire (not shown). A resilient support for the dandy roll is provided by pneumatic cushions 15 and 16, which are mounted on the frame members 2 and 3, respectively, and supplied with air pressure through an air system (not shown) on the papermaking machine. In the embodiment shown, the brackets 10 and 11 diverge and flare laterally so as to appear to toe out, and to overlap the papermaking machine frame members 2 and 3 inside of which the entire dandy roll 1 with its trunnions 4 and 5 is suspended. Alternatively, the brackets 10 and 11 could project straight in alignment with the rest of the bearing housings 6 and 7, respectively, and projections could be extended from the frame members 2 and 3 under the bracket 10 and 11, respectively.

Opposite the brackets 10 and 11, hinge members 17 and 18, which in this case are downwardly opening pintle hooks, extend horizontally from the bearing housing 6 and 7, respectively. A pintle stand 19 and 20 is bolted to each one of the frame members 2 and 3, respectively, and each pintle stand 21 and 22, respectively, that projects horizontally inwardly to be engaged by, and to support the pintle hooks 19 and 20, respectively, on the bearing housings 6 and 7. The pintle stands 21 and 22 with their respective pintles 23 and 24, respectively, form hinge members which mate with the pintle hooks 17 and 18, respectively, to form a hinge mounting for the dandy roll 1.

What is claimed is:

1. A bearing support apparatus for a dandy roll on a papermaking machine comprising the combination of
    a papermaking machine frame;
    a bearing housing for containing bearings rotatably supporting trunnions of a dandy roll;
    a hinge member projecting from one side of said bearing housing to engage a mounting hinge member on said papermaking machine frame;
    a pneumatic cushion resting upon said papermaking machine frame;
    a bracket projecting from an opposite side of said bearing housing from said one side to be supported upon said pneumatic cushion on said papermaking machine frame and having an adjustable support member projecting from it to rest upon said papermaking machine frame.

2. Apparatus for mounting a dandy roll on a frame of a papermaking machine comprising the combination of
    a papermaking machine frame;
    a cylindrical dandy roll having trunnions projecting from its ends;
    an annular cast bearing housing surrounding each of said trunnions and containing bearings for rotatably supporting said trunnions, said annular casting having a pick-up eye mounted to project upwardly from its top;
    a downwardly opening pintle hook integral with said annular cast bearing housing and projecting from one side of said annular cast of said bearing housing;
    a pintle stand anchored to said papermaking machine frame and having a pintle projecting transversely of said papermaking machine from it to engage said pintle hook;
    a flat bracket integral with and projecting laterally from an opposite side of said annular cast bearing housing and having a vertical supporting bolt adjustably threaded through a hole in said bracket to rest upon said papermaking machine frame;
    and a pneumatic cushion mounted between said papermaking machine frame and said bracket to resiliently support said bracket above said papermaking machine.

3. A bearing support apparatus for a dandy roll on a papermaking machine comprising the combination of
    a papermaking machine frame;
    a bearing housing for containing bearings rotatably supporting trunnions of a dandy roll;
    a hinge member projecting from one side of said bearing housing to engage a mounting hinge member on said papermaking machine frame;
    and a bracket projecting from an opposite side of said bearing housing from said one side to be supported upon the frame of said papermaking machine, said mounting hinge member on said papermaking machine frame is a pintle stand mounted on said papermaking machine frame and having a pintle projecting laterally from it;
    and said hinge member projecting from said one side of said bearing housing is a downwardly opening pintle hook adapted to pass over, engage and rest upon said pintle.

References Cited

UNITED STATES PATENTS

| | | | |
|---|---|---|---|
| 1,618,125 | 2/1927 | Harris | 308—63 X |
| 2,399,446 | 4/1946 | Morgan | 308—203 |
| 3,027,553 | 3/1962 | Sandor | 308—203 X |
| 3,350,144 | 10/1967 | Beckman et al. | 308—6 |

CARROLL B. DORITY, Jr., Primary Examiner

U.S. Cl. X.R.

308—15, 18

PO-1050
(5/69)

UNITED STATES PATENT OFFICE
CERTIFICATE OF CORRECTION

Patent No. 3,488,099          Dated March 10, 1970

Inventor(s) William S. Johnston

It is certified that error appears in the above-identified patent and that said Letters Patent are hereby corrected as shown below:

In Column 3, Line 21, after "22" insert --supports a pintle 23 and 24--.

SIGNED AND
SEALED

JUL 14 1970

(SEAL)
Attest:

Edward M. Fletcher, Jr.
Attesting Officer

WILLIAM E. SCHUYLER, JR.
Commissioner of Patents